(12) United States Patent
Azad et al.

(10) Patent No.: US 8,227,373 B1
(45) Date of Patent: Jul. 24, 2012

(54) EXHAUST GAS PURIFICATION CATALYSTS AND METHODS OF MAKING THE SAME

(75) Inventors: Abdul-Majeed Azad, Perrysburg, OH (US); Desikan Sundararajan, Toledo, OH (US)

(73) Assignee: The University of Toledo, Toledo, OH (US)

( * ) Notice: Subject to any disclaimer, the term of this patent is extended or adjusted under 35 U.S.C. 154(b) by 0 days.

(21) Appl. No.: 12/696,253

(22) Filed: Jan. 29, 2010

Related U.S. Application Data

(60) Provisional application No. 61/148,826, filed on Jan. 30, 2009.

(51) Int. Cl.
| | |
|---|---|
| *B01J 23/00* | (2006.01) |
| *B01J 23/10* | (2006.01) |
| *B01J 23/40* | (2006.01) |
| *B01J 23/42* | (2006.01) |
| *B01J 23/70* | (2006.01) |
| *B01J 23/74* | (2006.01) |
| *B01J 23/06* | (2006.01) |
| *B01J 23/72* | (2006.01) |
| *B01J 8/00* | (2006.01) |
| *B01J 8/02* | (2006.01) |
| *B01D 50/00* | (2006.01) |
| *B01D 53/34* | (2006.01) |
| *B01D 47/00* | (2006.01) |
| *B01D 53/46* | (2006.01) |
| *B01D 53/56* | (2006.01) |
| *B01D 53/86* | (2006.01) |
| *B01D 53/94* | (2006.01) |
| *B01D 53/02* | (2006.01) |
| *F01N 3/00* | (2006.01) |
| *F01N 3/10* | (2006.01) |
| *F23J 11/00* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01B 31/18* | (2006.01) |
| *C07C 11/24* | (2006.01) |
| *C10K 1/00* | (2006.01) |

(52) U.S. Cl. ........ 502/304; 502/302; 502/325; 502/326; 502/338; 502/343; 502/345; 502/349; 502/352; 422/168; 422/177; 60/299; 423/210; 423/213.2; 423/213.5; 423/239.1; 423/245.1; 423/247

(58) Field of Classification Search ................. 502/304, 502/325, 326, 338, 343, 345, 349, 350, 352, 502/302; 422/168, 177; 60/299; 423/210, 423/213.2, 213.5, 239.1, 245.1, 247
See application file for complete search history.

(56) References Cited

U.S. PATENT DOCUMENTS 3,370,914 A  2/1968  Gross et al.
(Continued)

OTHER PUBLICATIONS

Farrauto, R.J., "Automotive Emission Control: Past, Present and Future," NACS Newsletter, Jun. 2008, pp. 5-9, vol. 42.
Kizaki, H. et al., "Generation of Nano-Catalyst Particles by Spinodal Nano-Decomposition in Perovskite," Applied Physics Express, 2008, vol. 1.

(Continued)

*Primary Examiner* — Stanley Silverman
*Assistant Examiner* — Anthony J Zimmer
(74) *Attorney, Agent, or Firm* — MacMillan, Sobanski & Todd, LLC

(57) ABSTRACT

A catalyst and its use for the abatement of carbon monoxide and unburned hydrocarbons in the exit stream of a combustion device, such as an automobile and spray paint booths are disclosed.

34 Claims, 10 Drawing Sheets
(10 of 10 Drawing Sheet(s) Filed in Color)

U.S. PATENT DOCUMENTS

| | | | |
|---|---|---|---|
| 4,091,072 A | | 5/1978 | McArthur |
| 4,158,643 A | | 6/1979 | Sinha |
| 4,446,249 A | * | 5/1984 | Eden ............................ 502/225 |
| 5,308,457 A | * | 5/1994 | Dalla Betta et al. ............ 95/143 |
| 5,381,660 A | | 1/1995 | Loving et al. |
| 6,294,140 B1 | * | 9/2001 | Mussmann et al. ........ 423/213.5 |
| 7,093,428 B2 | | 8/2006 | LaBarge et al. |
| 7,329,359 B2 | * | 2/2008 | Roark ............................ 210/763 |
| 2003/0235526 A1 | * | 12/2003 | Vanderspurt et al. ......... 423/263 |
| 2007/0093382 A1 | * | 4/2007 | Vanderspurt et al. ......... 502/304 |
| 2009/0170689 A1 | * | 7/2009 | Hatanaka et al. ............... 502/50 |
| 2009/0324468 A1 | * | 12/2009 | Golden et al. ................ 423/210 |

OTHER PUBLICATIONS

Sekine, Y. et al., "Synergistic Effect of Pt or Pd and Perovskite Oxide for Water Gas Shift Reaction," Applied Catalysis A: General, 2009, pp. 214-222, vol. 352.

Taniguchi, M. et al., "The Self-Regeneratice Pd-, Rh-, and Pt-Perovskite Catalysts," Topics in Catalysis, 2007, pp. 367-371, Vols. 42-43.

Zhang, L. et al., "Investigation of Highly Active Fe-Al-Cu Catalysts for Water-Gas Shift Reaction," Applied Catalysis A: General, Dec. 2008, pp. 1-8, vol. 351, Issue 1.

* cited by examiner

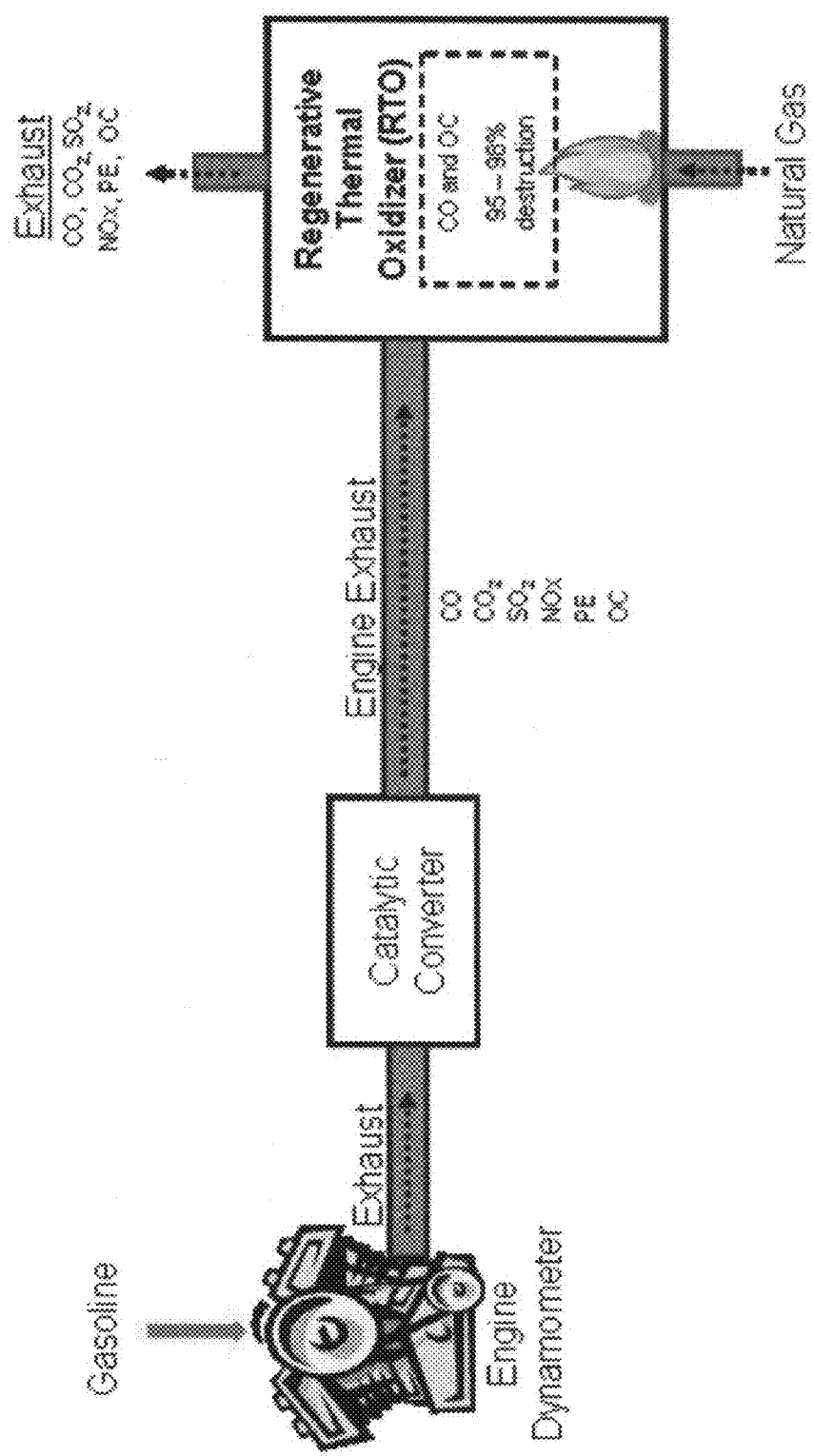
Figure 1a - Prior Art

US 8,227,373 B1

EXHAUST GAS PURIFICATION CATALYSTS AND METHODS OF MAKING THE SAME

CROSS-REFERENCE TO RELATED APPLICATIONS AND STATEMENT REGARDING SPONSORED RESEARCH

The present invention claims the benefit of the provisional patent application Ser. No. 61/148,826 filed Jan. 30, 2009. This invention was made with no government support and the government has no rights in this invention.

TECHNICAL FIELD

The invention pertains to the development of pollutant radiation catalysts and to the use of such catalysts in the quantitative elimination of carbon monoxide and hydrocarbons from exhaust streams of automobiles. This invention includes embodiments that may pertain to catalysts. This invention includes embodiments that relate to methods of making catalysts. This invention includes embodiments that relate to articles that include catalysts.

BACKGROUND

Exhaust streams generated by the combustion of fossil fuels contain different types of pollutants, such as carbon monoxide (CO), oxides of sulfur ($SO_x$; x=2 or 3), unburned hydrocarbons (HCs), volatile organic compounds (VOCs) and nitrogen oxides ($NO_x$). While there are different catalytic devices and methods to treat exhaust streams, it is difficult to remove such pollutants as $NO_x$ and $SO_x$ from the exhaust stream.

The rate of conversion of the pollutants often depends on the exhaust gas temperatures. For example, automobile catalytic converters may need to operate at an elevated temperature of about 300° C. or higher. However, there is an initial time period between when the exhaust emissions begin (i.e., "cold start") and the time when the catalytic converter heats up. This time is often called the "light-off time." The "light-off temperature" is the catalyst temperature at which fifty percent (50%) of the emissions from the engine convert as they pass through the catalyst; it is represented as $T_{50}$.

While the exhaust gases may heat the catalytic converter and such heating helps in bringing the catalyst to the light-off temperature, the initial exhaust gases generally pass through the catalytic converter relatively unchanged until the light-off temperature. Also, it has been found that the composition of the exhaust gas itself changes as the temperature increases from a cold start temperature to the operating temperature.

The earliest automotive catalysts were developed in the mid '70s to facilitate quantitative oxidation of carbon monoxide and unburned hydrocarbons to $CO_2$ and $H_2O$. Almost all the earlier automotive catalysts comprised of an inert ceramic support loaded with noble metal, as precious metals are known to be excellent oxidation catalysts. However, the catalysts come at a premium price, which has increased to an unprecedented level in the past 5 years. In particular, the amount of such precious metals as Rh, Pt and Pd used for automotive catalysts has increased as a whole over the last decade. Among these precious metals, the demand for Pd rapidly grew since there was an issue related to the need of reducing the cold start hydrocarbon (HC) and carbon monoxide (CO) emissions.

This increasing demand has led to the search and use of alternative formulations that have less expensive and more readily available base metal oxides such as those of Co, Ni, Cu and even Cr. However, due to their hydrothermal stability and propensity to poisoning by the presence of sulfur inherent in the fuel, these base metals do not qualify to meet the stringent specifications that are required for automotive catalysts. Hence, precious metal-catalyzed systems became the only viable automotive catalysts.

It is therefore desirable to have a catalyst composition that is useful both before and after the light off temperature is reached.

It is also desirable to have a catalyst composition that is effective for emission reductions across a range of temperatures and operating conditions that differ from those currently available.

It is also desirable to have a catalyst composition that is effective in reducing such different types of pollutants as CO, $SO_2$, and $NO_x$, in addition to removing HCs and VOCs.

BRIEF DESCRIPTION

Disclosed herein is a catalyst composition that comprises a dispersion of a non-precious catalytic component and a high surface area substrate material, also known as catalytic support. The substrate material comprises a ceramic with the known characteristic of oxygen storage capacity (OSC), in an amount sufficient to make the substrate material substantially chemically and structurally stable in redox environments.

Described herein is a catalyst composition comprising a dispersion of a catalytic component and a high surface area substrate material, where the substrate material is known for its oxygen storage capacity (OSC) characteristic, in an amount sufficient to make the substrate material substantially chemically and structurally stable in redox environments.

In certain embodiments, the dispersion comprises a substantially uniform mixture of the catalytic component and the high surface area substrate material.

In certain embodiments, the catalyst composition contains substantially no noble metal incorporation.

In certain embodiments, the catalyst composition contains a level of noble metal not greater than about 5 wt %.

In certain embodiments, the catalytic component dispersed onto the substrate material forms a substantially uniform and homogenous nanoscale dispersion on the substrate matrix.

In certain embodiments, the substrate material comprises a host and a dopant wherein the dopant is present at about 1 to about 25%, by mole fraction, of the substrate material.

In certain embodiments, the dopant is present in an amount between about 1% and about 10%, by mole fraction, of the substrate material.

In certain embodiments, the substrate material comprises ceria doped with at least one dopant sufficient to impart stability and enhance oxygen ion transport via vacancy creation to the catalyst composition.

In certain embodiments, the dopant comprises one or more of gadolinium oxide (gadolinia, $Gd_2O_3$) and zirconium oxide (zirconia, $ZrO_2$).

In certain embodiments, the substrate material comprises one or more of gadolinia-doped ceria (GDC) and zirconia-doped ceria (ZDC).

In certain embodiments, the substrate material has a surface area of at least about 120 $m^2$/g.

In certain embodiments, the substrate material has a surface area of at least about 150 $m^2$/g.

In certain embodiments, the substrate material comprises particles having sizes ranging between about 5 nm and about 20 nm.

In certain embodiments, the substrate material is porous and provides a high degree of dispersion of the catalytic component therein.

In certain embodiments, the catalytic component comprises one or more metal oxides (MOs) selected from those of titanium, iron, copper, zinc and tin.

In certain embodiments, the substrate material comprises a porous ceria material, and the catalytic component is dispersed effectively over the entire surface of the substrate material.

In certain embodiments, the catalyst composition further includes one or more of: gold, platinum, palladium or rhodium particles having sizes ranging between about 5 nm and about 10 nm.

In certain embodiments, the catalyst composition comprises a substantially uniform mixture of a non-noble metal catalytic component and substrate material provided as a free-flowing dry powder.

Described herein is a catalyst system comprising a catalyst composition in a packed bed or fluidized bed without any accompanying support.

Described herein is a catalyst system comprising a catalyst composition provided on a support structure.

In certain embodiments, the support structure comprises of a ceramic monolith or honeycomb structure.

In certain embodiments, the support ceramic monolith or honeycomb comprises one or more of: alumina, silica, aluminosilicates, and stainless steel or other structural alloys.

In certain embodiments, the catalytic component is present in a total amount between about 0.5% and about 20%, by weight, of the catalyst composition.

In certain embodiments, the catalytic component is present in a total amount between about 1 and about 10%, by weight, of the catalyst composition.

In certain embodiments, the catalytic component comprises one or more metal oxides selected from the group of $TiO_2$ (titanium oxide), $Fe_2O_3$ (iron oxide), CuO (copper oxide), ZnO (zinc oxide), tin oxide ($SnO_2$), and combinations thereof.

Described herein is a catalyst composition for use at temperatures at about 250° C. up to about 500° C. comprising a non-precious catalytic component deposited on a substrate material, wherein the substrate material comprises a high surface area material with a surface area from about 120 $m^2$/g to about 200 $m^2$/g.

Described herein is a catalytic system for the near complete elimination of harmful pollutants such as CO, HCs, VOCs, $NO_x$ and $SO_x$ from the automotive exhaust, power generating systems and paint booths.

Described herein is a method of making a catalyst composition comprising: forming slurry of at least one nanocrystalline sized substrate material and at least one water soluble salt of a catalytic component, and mixing and heating the slurry to substantially remove solvent fractions from the slurry.

In certain embodiments, the method includes adding at least one active substrate and at least one catalytic component to a liquid medium, and mixing so that the catalytic components are incorporated homogeneously throughout the substrate matrix.

In certain embodiments, the substrate material is produced by a method that includes hydrothermal processing.

In certain embodiments, the substrate material comprises ceria doped with gadolinia (GDC) or ceria doped with zirconia (ZDC), and the method includes: bringing salts of gadolinium and cerium or zirconium and cerium into solution; precipitating out from the solution; and subjecting the precipitate to a high pressure-low temperature process sufficient to causes material crystallization of the substrate material having nanocrystalline features.

In certain other embodiments, a condensation process can be used to heat and mix the slurry. For example, in certain embodiments, the condensation process includes a rotary evaporation process where the slurry is placed in a heated water bath and rotated to cause effective mixing and evaporation of the solvent, producing a semisolid matrix.

In certain embodiments, the matrix is placed in a vacuum oven and dried to a solid cake and/or powder.

Described herein is a method for forming a exhausts control device comprising: placing a support structure in a slurry comprised of at least one nanocrystalline sized substrate material and at least one water soluble salt of a catalytic component, and mixing and heating the slurry with the support structure therein to substantially remove solvent fractions from the slurry.

Described herein is a use of a catalyst composition in the abatement of automotive exhaust emissions.

Described herein is a use of a catalyst composition in the abatement of spray booth exhaust emissions.

Described herein is an automobile exhaust gas treatment catalyst having increased resistance to poisoning from oil- and/or fuel-derived additives.

Described herein is an exhaust gas treatment catalyst system, wherein the system comprises a support that is washcoated with a catalyst composition as described herein.

Described herein is an automobile exhaust gas treatment catalyst system having increased resistance to poisoning from oil- and/or fuel-derived additives, comprising at least one catalyst composition as described herein.

In certain embodiments, the system comprises a monolith disposed within an exhaust stream of a combustion engine.

In certain embodiments, the system has a concentration level of at least CO that is reduced by at least about 40% at 250° C.

In certain embodiments, the system has a concentration level of at least CO that is reduced by at least about 85% at 500° C.

In certain embodiments, the system has a concentration level of at least CO that is reduced by at least about 95% at 500° C.

In certain embodiments, the system has a concentration level of at least CO that is reduced by at least about 60% at 250° C.

In certain embodiments, the system has a concentration level of at least HCs that is reduced by at least about 70% at 500° C.

Described herein is a method of treating an automobile exhaust gas comprising: contacting an exhaust gas stream with a catalyst composition, the catalyst having increased resistance to poisoning from oil- and/or fuel-derived additives including one or more of: CO, HCs, VOCs, $SO_x$ and $NO_x$.

Described herein is a spray booth exhaust gas treatment catalyst having increased resistance to poisoning from hydrocarbons present in the exhaust gas.

Described herein is a method of treating a spray booth exhaust gas comprising: contacting an exhaust gas stream with a catalyst composition, the catalyst having increased resistance to poisoning from oil- and/or fuel-derived additives including one or more of: CO, HCs, VOCs, $SO_x$ and $NO_x$.

Described herein is a method for treating a gas comprising one or more of carbon monoxide, hydrocarbons and nitrogen oxides, the method comprising: contacting the catalyst composition with the gas, and catalytically oxidizing the hydrocarbons and carbon monoxide and catalytically reducing the nitrogen oxides in the gas in the presence of the catalyst composition.

Various advantages of this invention will become apparent to those skilled in the art from the following detailed description of the preferred embodiments, when read in light of the accompanying drawings.

BRIEF DESCRIPTION OF FIGURES

The patent or application file contains at least one drawing executed in color. Copies of this patent with color drawings will be provided by the United States Patent and Trademark Office upon request and payment of necessary fee.

Prior Art FIG. 1a is a schematic illustration of a current strategy for the elimination of certain pollutants from automotive exhausts.

DETAILED DESCRIPTION

Figure 1B:
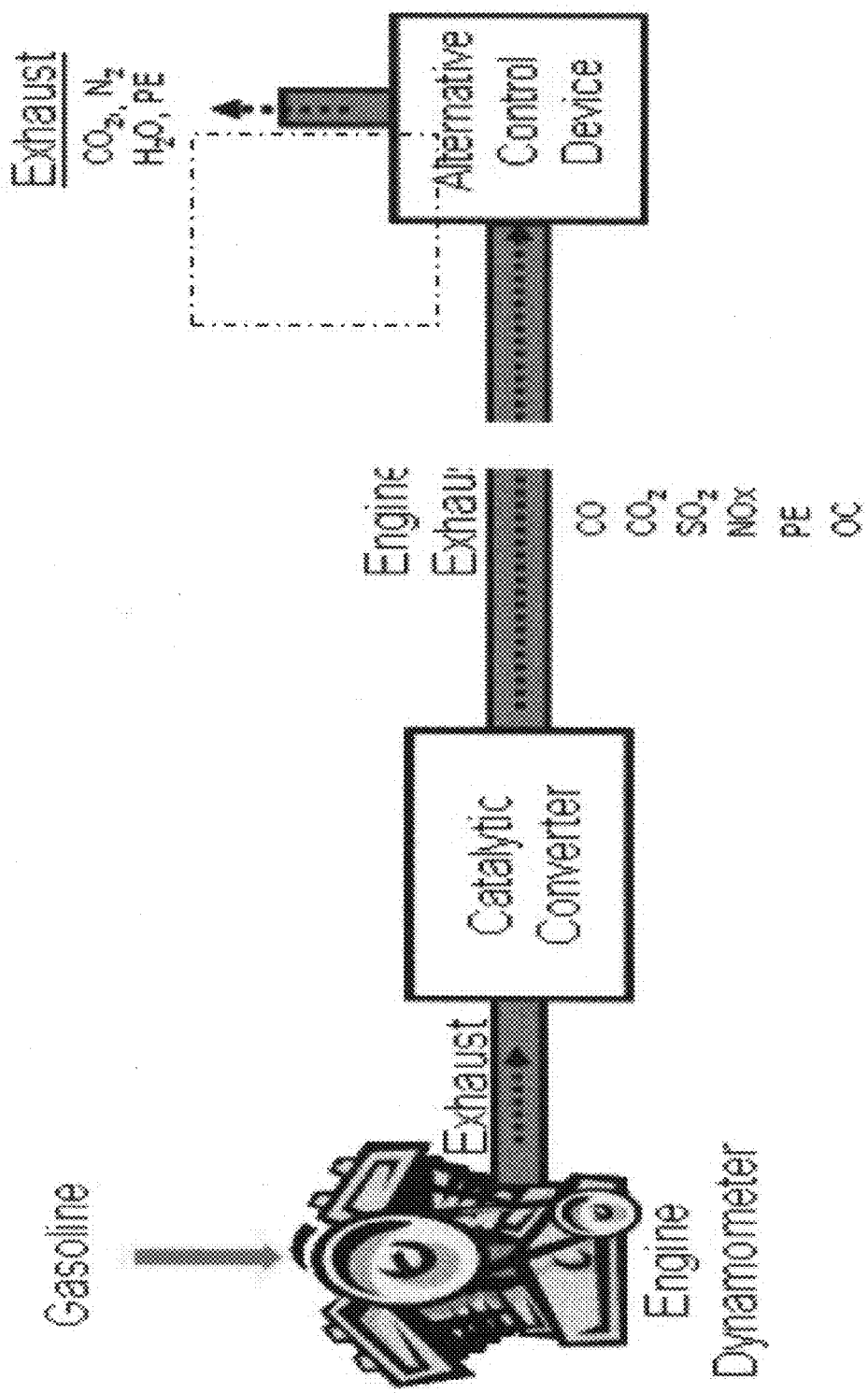
FIG. 1b is a schematic illustration of a method described herein for the elimination of certain pollutants from automotive exhausts.

In one aspect, there is provided an exhaust gas purification catalyst composition. The catalyst composition may be suitable for use in many different applications where significant abatement in the emission levels of carbon monoxide, hydrocarbons, sulfur oxide(s) and nitrogen oxide(s) is mandated by federal and state laws.

In another aspect, there is provided herein a purification catalyst for exhaust gas, to a production method thereof, and to purification catalyst equipment for exhaust gas, and specifically relates to a production technique of a purification catalyst for exhaust gas in which carbon monoxide (CO), hydrocarbons (HCs), volatile organic compounds (VOCs), sulfur oxides ($SO_x$) and nitrogen oxides (NOx) contained in a exhaust gas emitted from an internal combustion engine (for example, in a vehicle) can be simultaneously and effectively reduced, thereby reducing the undesirable components of the exhaust gas.

The catalyst composition is very effective over a wide range of temperature. The catalyst compositions described herein have pollutant removal capacities that range from about 60% at 250° C. to about 98% at 500° C., which is commercially very attractive. In addition, the catalyst compositions described herein are not pyrophoric and need not be protected from air and moisture.

In certain embodiments, the catalyst composition can be used either as a stand-alone device or in conjunction with a three-way catalyst (TWC) for the near complete elimination of harmful pollutants such as CO, HCs, VOCs, $NO_x$ and $SO_x$ from the automotive exhaust and other power generating systems.

In another aspect, there is provided herein an automotive exhaust purification device that includes a ceramic honeycombed-structured monolith support structure and a catalyst composition that is supported on the support structure.

In one particular aspect, the catalyst composition comprises a non-precious metal (also referred to herein as "non-noble") formulation that is dispersed uniformly and homogenously onto a substrate material.

The exhaust purification catalyst compositions with no noble metal incorporation provide for lowered cost catalyst than that reported in the literature hitherto, without compromising the performance in anyway. Also, in certain embodiments, the substrate material is comprised of a high surface area active substrate material which is different from traditionally used inert substrate materials, such as alumina, magnesia, silica or zirconia.

The high surface area active substrate is endowed with what is called "oxygen storage capacity" (OSC) contrary to the currently used inert supports. The OSC property makes the support chemically and structurally stable in redox environments which are encountered in the abatement of automotive exhaust emissions.

In certain embodiments, the active substrate material is comprised of a host and a dopant, where the host is a material such as ceria described above that forms a major portion of the structure of the catalytic support, and the dopant is a different material present in a smaller amount that contributes to forming the structure of the catalytic support, to stabilize it and to enhance its mechanical properties. The dopant can be used in any suitable amount, for example, an amount between about 1% and about 25% by mole fraction of the catalytic support. In certain embodiments, the active substrate can comprise nanoscale ceria matrix, for example, ceria nominally doped with $Gd_2O_3$ or $ZrO_2$ in order to impart additional stability and enhance oxygen ion transport via vacancy creation.

In certain embodiments, the active substrate material has a high surface area and a small particle size, which aids in providing high activity. For example, the active substrate material may have a surface area of at least 120 $m^2/g$, and preferably at least about 150 $m^2/g$. In certain embodiments, the active substrate material is a nanoscale material, having any suitable nanoscale particle size, for example a particle size ranging between about 5 nm and about 20 nm.

Also, in certain embodiments, the active substrate material is porous and provides a high degree of dispersion of the catalyst(s) and additive(s).

In a particular embodiment, the active substrate material is comprised of ceria which is doped with gadolinia, which is referred to hereafter as gadolinia-doped ceria (GDC), and/or ceria which is doped with zirconia, which is referred to hereafter as zirconia doped-ceria (ZDC).

In a particular aspect, the catalyst composition can be advantageously used to reduce $NO_x$, pollutants as well that are present in gas exhaust emissions generated in gas and diesel combustion engines, paint booths, furnaces, ovens, and the like. The variety of hydrocarbons also present in such gas exhaust emissions can be used as a reductant in the catalytic process where the catalyst compositions described herein are used.

The catalyst composition includes a catalytic component that is dispersed on the active substrate material. The catalytic component is comprised of at least one catalyst that is suitable for catalyzing pollutants in the exhaust process. In certain embodiments, the catalytic component is a combination of metal oxides (MOs) selected from those of titanium, iron, copper, zinc and tin. In a particular embodiment, on or more of the metal oxides are dispersed effectively over the entire surface of the active substrate material.

It is to be understood that highly desirable results are obtained when the catalyst compositions as described herein contain no noble metals.

In certain embodiments, the active component (also called the "catalytic component" herein) of the catalyst composition comprises one, two, three or four metal oxides in lieu of noble metals. In some aspects, one or more of these metal oxides provide a synergistic improvement in performance. Various suitable amounts of the catalytic component can be used in the composition, for example, a total amount between about 0.5% and about 10%, by weight, of the catalyst composition.

Different suitable metal oxides or a combination of different metal oxides can be used as the catalytic component. In certain embodiments, the metal oxide can be selected from the group of $TiO_2$ (titanium dioxide) $Fe_2O_3$ (iron oxide), CuO (copper oxide), ZnO (zinc oxide), tin oxide ($SnO_2$), and any combinations thereof. The metal oxide(s) can be used in any suitable amount, for example, any amount up to about 2 to about 20 wt % of the catalyst composition. More specifically, the weight percent of the metal oxide(s) can vary between about 0.5 and about 10 wt % of the catalyst composition.

In certain embodiments, the metal oxide(s) comprise about 2 to about 7 wt % of the catalyst composition. In certain preferred embodiments, for example, one or more of the metal oxides can be present as follows: about 0.5 to about 5 wt % CuO about 2 to about 4 wt % ZnO; about 0.5 to about 3 wt % $SnO_2$; and/or about 0.5 to about 5 wt % $Fe_2O_3$.

One exemplary amount of a metal oxide formulation is about 2.5 wt % CuO and about 2.5 wt % ZnO.

One exemplary amount of a metal oxide formulation is about 2.5 wt % CuO, about 2.5 wt % ZnO, and about 0.5 wt % $Fe_2O_3$.

One exemplary amount of a metal oxide formulation is about 2.5 wt % CuO, about 2.5 wt % ZnO, about 1 wt % $SnO_2$, and about 1 wt % $Fe_2O_3$.

In certain embodiments, the catalyst composition includes one or more metal oxides that are dispersed and homogenized thoroughly over the entire surface and bulk of the active substrate. For example, as shown in the examples herein, multi-metal oxide catalyzed-GDC compositions maintain their operational integrity (activity and capacity) over extended periods of time and over multiple thermal cycles at temperatures in the range of 250 to 500° C.

It is to be understood, however, that in other embodiments, the catalyst compositions can include small amounts of noble metals as well that are present in amounts much smaller than used in prior catalytic devices. As such, in these certain embodiments, the catalyst composition could include one or more of such noble metals as gold, platinum, palladium or rhodium in nanoscale. Also, in some specific embodiments, the catalyst formulations do not include gold or any platinum group metals (PGMs). In such particular embodiments, the noble metals are used in small amounts, for example, 0.05 to about 5 wt % of the catalyst composition. More specifically, the weight percent of the noble metals can vary between about 0 and about 2.0 wt % of the catalyst composition.

One exemplary amount of a metal oxide formulation is about 1 wt % Pt, and about 1 wt % CuO.

One exemplary amount of a metal oxide formulation is about 1 wt % Pt, and about 5 wt % CuO.

One exemplary amount of a metal oxide formulation is about 1 wt % Pt, about 1 wt % CuO, and about 1 wt % $Fe_2O_3$.

One exemplary amount of a metal oxide formulation is about 1 wt % Pt, about 2.8 wt % CuO, and about 0.55 wt % $Fe_2O_3$.

One exemplary amount of a metal oxide formulation is about 1 wt % Pt, about 2.75 wt % CuO, and about 0.5 wt % $Fe_2O_3$.

One exemplary amount of a metal oxide formulation is about 1 wt % Pt, about 3.5 wt % CuO, and about 0.5 wt % $Fe_2O_3$.

One exemplary amount of a metal oxide formulation is about 1 wt % Pt, about 5 wt % CuO, and about 1 wt % $Fe_2O_3$.

One exemplary amount of a metal oxide formulation is about 1 wt % Au, and about 5 wt % $TiO_2$.

In another particular aspect, the dispersion of the non-noble metal formulation on a high surface area substrate is conducted using a method which is different from the currently in vogue techniques such as incipient wetting, as further described herein.

In a particular embodiment, the method can be used to achieve a uniform adherent coating of the catalytic formulation on ceramic monoliths with hundreds of channels per square inch.

In one embodiment, catalyst composition comprises an intimate and uniform mixture of the metal oxide formulation and the active substrate that is provided as a free-flowing dry powder and which can be used in a packed bed or fluidized bed without any accompanying support.

In another embodiment, catalyst composition comprises an intimate and uniform mixture of the metal oxide formulation and the active substrate that is provided as a washcoat on a support structure. Non-limiting examples of suitable support structures include ceramic monolith or honeycomb structures containing several hundred uniform channels per square inch. In certain embodiments, the support ceramic monolith or honeycomb can be comprised of alumina, silica, aluminosilicates, and/or stainless steel or other structural materials.

Also, any suitable material or combinations of different materials can be used for making the support structure. For example, the support structure can be made from aluminum oxide (or alumina, $Al_2O_3$; preferably in gamma phase), magnesium oxide (or magnesia, MgO) and silicon dioxide (or silica, $SiO_2$). In certain embodiments, the support structure can be made from cerium oxide (or ceria, $CeO_2$) since ceria itself has catalytic properties (such as OSC) such that when ceria is used with the catalyst composition, the effectiveness of the catalyst composition is accentuated.

In certain embodiments, the support structure is a ceramic honeycomb (monolith) with several hundred channels per square inch (cpsi)—100 to 400 cpsi, the channels being identical in shape, wall thickness and pore size. For example, the honeycomb can be a ceramic monolith, cylindrical in shape with 400 cpsi with channel wall thickness 7 μM; however, monoliths of any geometrical shape, dimensions, cpsi specifications and wall thicknesses can be employed, depending upon the requirement of the intended application. In another non-limiting embodiment, the support structure can be a stainless steel monolith. In yet another non-limiting embodiment, the support structure can be comprised of cordierite (aluminosilicate).

The support structure includes a washcoat comprised of the catalyst composition described herein. In one example, the washcoat is comprised of doped ceria base materials, where the level of gadolinia ranges between about 5 to about 20 mol %; and in certain embodiments, the range of gadolinia is between about 7.5 and about 12.5 mol %; and is a particular embodiment, is about 10 mol %.

Examples of Methods of Making the Catalyst Composition

In certain embodiments, the active components of the exhaust purification catalysts (GDC/ZDC and the metal oxides) can be made by any suitable method of material synthesis, well-known to, and commonly practiced by, those skilled in such art. Non-limiting examples of such fabrication methods include: solid-state reaction, sol-gel technique, co-precipitation, hydrothermal processing, organometallic combustion and the like.

In certain preferred embodiments, the methods include effectively incorporating the active metal oxides (with or without the noble metal component) into the active substrate support structure without degrading active substrate's nanoscale morphological features.

It is to be understood, however, that in another aspect, there is described herein a method that is particularly suited for making catalytic systems that include the catalyst compositions described herein.

Preparation of Catalyst Compositions

The method described herein yields a highly uniform, active and agile catalyst composition. In certain embodiments, the catalyst composition is made by adding both the active substrate and the catalytic components to a liquid medium, and well dispersing the materials by mixing thoroughly so that the active oxides are incorporated homogeneously throughout the active substrate.

In certain embodiments, the method produces an active substrate having a high surface area and a small particle size.

In certain embodiments, the active substrate is produced by a method that includes hydrothermal processing. For example, in the production of a gadolinia-doped ceria (GDC) or zirconia-doped ceria (ZDC) substrate, the salts of gadolinium and cerium or zirconium and cerium are first brought into solution, and then precipitated. The precipitate is then subjected to hydrothermal processing in an autoclave, whereby the high pressure-low temperature process causes material crystallization to produce an active substrate having nanocrystalline features.

To complete the production of the catalyst composition, the active substrate is brought into slurry using a suitable medium such as water, isopropyl alcohol (IPA) or ethanol. To the slurry are added water soluble salts of the noble metal catalyst(s) and/or the water soluble salts of the metal oxide catalysts. For example, copper nitrate can be added to produce copper oxide in the final product; or, iron nitrate is added to produce iron oxide and so on.

In some embodiments, the desired oxides can be added directly to the slurry and the slurry is subjected to a condensation process. In one embodiment, the condensation process includes a rotary evaporation process where the slurry is placed in a heated water bath and rotated to cause effective mixing and evaporation of the solvent, producing a semisolid matrix. The matrix can then be placed in a vacuum oven and dried to a solid cake. The cake is broken up and then pulverized into a powder. The powder is then fired to produce the final catalyst composition.

Preparation of Catalyst Washcoat

The catalyst powder can be coated on the support structure (for example, a cordierite monolith) in the rotary evaporator using ethanol as the dispersing medium and dried overnight in a fume hood at room temperature. Further drying in an air oven at 80° C. followed by calcination in static air at 700° C. for 2 h, completes the process of making the washcoat.

In one example, the loading of the catalyst composition on a cylindrical monolith that is 2-in. long and 1-in in diameter with 400 channels per square inch (400 cpsi) is about 3.6 to about 3.8 g with average volumetric catalyst loading being about 2 g/in³. As shown in the examples herein, such monoliths can withstand high flow rates and experience little or no pressure drop due to open channel structure. In another example, the loading of the catalyst composition on a cylindrical monolith that is 12-in. long and 3-in in diameter with 400 channels per square inch (400 cpsi) is about 170 g.

In order that the nature of the compositions and the methods described herein may be more clearly understood, preferred forms thereof will now be described by reference to the following experimental results and examples. Non-limiting examples of compositions of the formulations developed and used in this invention are shown in Table 1.

TABLE 1 shows various catalyst formulations, test regimes and highest carbon monoxide (CO) conversions for such formulations.

| Sample ID | Catalyst Composition | Test regime/ ° C. | Highest CO conversion |
|---|---|---|---|
| 1X | GDC with 1 wt % Pt, 1 wt % CuO | 250-350 | 51% @ 350° C. |
| 1X5 | GDC with 1 wt % Pt, 5 wt % CuO | 300-375 | 40.4% @ 250° C. |

TABLE 1-continued shows various catalyst formulations, test regimes and highest carbon monoxide (CO) conversions for such formulations.

| Sample ID | Catalyst Composition | Test regime/ °C. | Highest CO conversion |
|---|---|---|---|
| 1XF | GDC with 1 wt % Pt, 1 wt % CuO, 1 wt % $Fe_2O_3$ | 250-350 | 39.2% @ 250° C. |
| 1X5F Blend 1 | GDC with 1 wt % Pt, 2.8 wt % CuO, 0.55 wt % $Fe_2O_3$ | 250-400 | 64.4% @ 400° C. |
| 2X5 | ZDC with 1 wt % Pt, 5 wt % CuO | 250-375 | 64% @ 375° C. |
| 2L | ZDC with 1 wt % Pd, 1 wt % CuO | 250-350 | 31.6% @ 350° C. |
| 2X5F | ZDC with 1 wt % Pt, 5 wt % CuO, 1 wt % $Fe_2O_3$ | 250-400 | 51.6% @ 325° C. |
| 1X5F Blend 2 | GDC with 1 wt % Pt, 2.75 wt % CuO, 0.5 wt % $Fe_2O_3$ | 250-400 | 65.8% @ 400° C. |
| 2X5 Blend 2 | ZDC with 1 wt % Pt, 2.75 wt % CuO, 0.5 wt % $Fe_2O_3$ | — | — |
| WGS 2 | GDC with 2.5 wt % CuO, 2.5 wt % ZnO | 250-350 | 40% @ 350° C. |
| WGS 1 | GDC with 1 wt % Au, 5 wt % $TiO_2$ | 250-325 | 25% @ 300° C. |
| 1X3.5FB2 | GDC with 1 wt % Pt, 3.5 wt % CuO, 0.5 wt % $Fe_2O_3$ | 250-400 | 77.6% @ 400° C. |
| 2X3.5FB | ZDC with 1 wt % Pt, 3.5 wt % CuO, 0.5 wt % $Fe_2O_3$ | 250-400 | 67.1% @ 400° C. |
| WGS2B1 | GDC with 2.5 wt % CuO, 2.5 wt % ZnO, 0.5 wt % $Fe_2O_3$ | 250-400 | 70.2% @ 400° C. |
| WGS2B2 | GDC with 2.5 wt % CuO, 2.5 wt % ZnO, 1 wt % $SnO_2$, 1 wt % $Fe_2O_3$ | 250-400 | 78.4% @ 400° C. |

TABLE 2

Table 2 shows various catalyst formulations, test regimes and highest carbon monoxide (CO) conversions for such formulations.

| Sample ID | Catalyst Composition | Test regime/ °C. | Highest CO conversion |
|---|---|---|---|
| WGS2B2 | GDC with 2.5 wt % CuO, 2.5 wt % ZnO, w1 wt % $SnO_2$, 1 wt % $Fe_2O_3$ | 250-500 | 99.80% @ 500° C. |
| WGS2B2 | GDC with 2.5 wt % CuO, 2.5 wt % ZnO, w1 wt % $SnO_2$, 1 wt % $Fe_2O_3$ | 250-500 | 97.2% @ 400° C. in 15 ppm Toulene |
| 1X3.5FB2 | GDC with 1 wt % Pt, 3.5 wt % CuO, 0.5 wt % $Fe_2O_3$ | 250-400 | 98.80% @ 400° C. |
| 1X3.5FB2 | GDC with 1 wt % Pt, 3.5 wt % CuO, 0.5 wt % $Fe_2O_3$ | 250-400 | 96.8% @ 400° C. in 15 ppm Toulene |

Catalyst Performance Evaluation

For the CO elimination experiments, each formulation was tested in three CO-laden streams: a) commercial gas mixture containing 5000 ppm CO-balance $N_2$; b) simulated gas mixture containing 5000 ppm CO, 15000 ppm $O_2$, 25 ppm $SO_2$, 17 ppm $NO_2$-balance $N_2$; and, c) Unleaded Test Gas UTG 96 (nominally $C_8H_{15}$). Prior to testing, each of the three streams was humidified with 6% water vapor.

In the case of UTG 96, the tests were conducted at 500° C. in 6 modes under various power conditions of a portable Honda generator set (power rating 4.5 kW at 100%) for duration ranging between 6 to 60 minutes per mode. The 6 modes were: idle (0%), 11%, 28%, 50%, 75% and 100% of fuel consumption in the generator set.

FIGS. 1a-1b provide a schematic comparison showing differences in pollutant elimination from typical automotive exhausts between currently used processes (Prior Art FIG. 1a) and a process using the catalyst compositions described herein (FIG. 1b). As schematically illustrated in Prior Art FIG. 1a, when an engine is run and exhaust is passed through a catalytic converter, the engine exhaust still generally contains pollutants such as CO, $CO_2$, $SO_2$, $NO_x$, PE and VOCs. In order to further remove such pollutants, the engine exhaust is passed through a regenerative thermal oxidizer (RTO). The RTO must be heated to very high temperatures, often consuming large amounts of natural gas, in order to achieve about a 95%-98% destruction of the CO and VOC pollutants. The final exhaust from the RTO, however, still contains the $CO_2$, $SO_2$, $NO_x$, PE and some CO and VOCs pollutants.

One embodiment of the system generally described herein is schematically illustrated in FIG. 1b, which shows that, in order to remove pollutants, the engine exhaust is passed through an alternative control device that incorporates the system described herein. As further described herein, the system achieve about a 99% destruction of pollutants such as CO, $SO_2$, $NO_x$, PE and VOCs. The final exhaust contains, for example, $CO_2$, $N_2$, $H_2O$ and PE. It also is to be noted that, in certain embodiments, the system can be operated where no catalytic converter is needed to pre-treat the engine exhaust.

Figure 2:
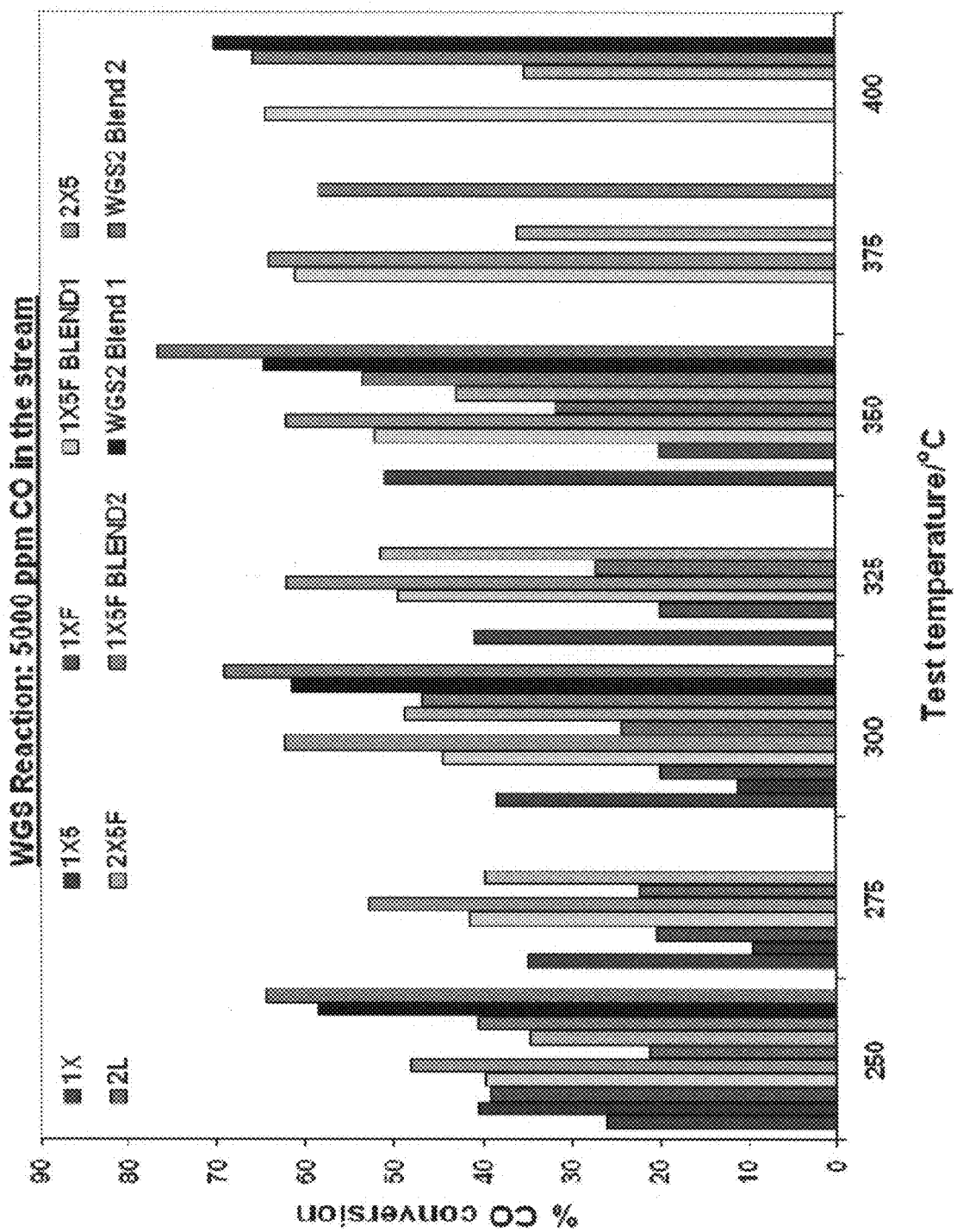
FIG. 2 is a graph showing the percent CO elimination (% CO conversion) from a stream containing 5000 ppm CO (balance $N_2$) on different catalysts, at temperatures ranging from 250 to 400° C. The water content in the stream is 6%.

FIG. 2 summarizes the CO elimination capability (in terms of % CO conversion) of different formulations, over a temperature range of 250 to 400° C., using a commercial $N_2$ tank containing 5000 ppm CO. FIG. 2 shows that the propensity of CO elimination is improved with increase in temperature; for example, in most of the cases, better CO elimination was obtained at a higher end of the temperature regime employed.

Figure 3:
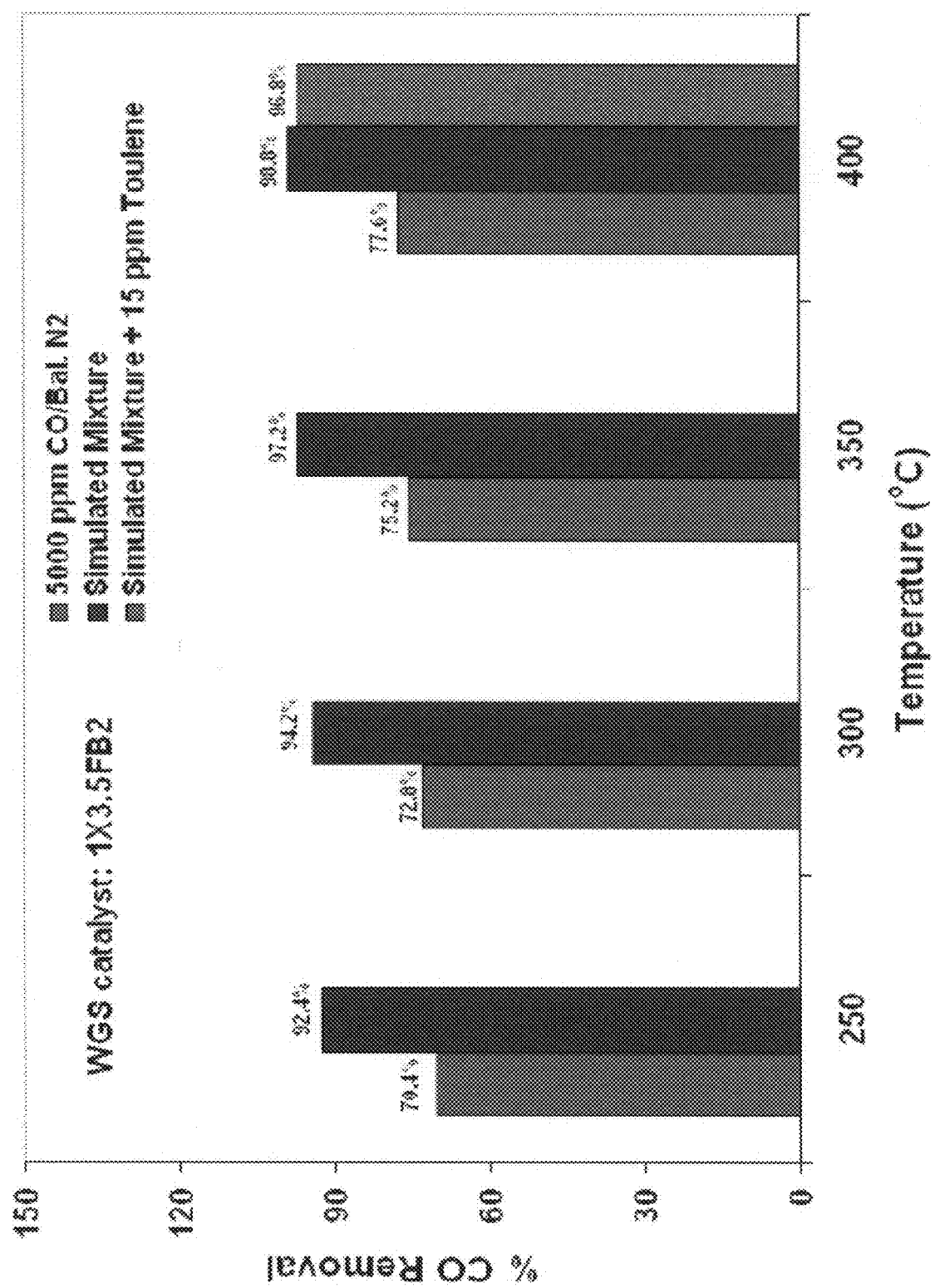
FIG. 3 is a graph comparing the behavior of a water-gas shift (WGS) catalyst, 1X3.5FB2, (which contains a small amount of a noble metal along with base metal oxides) in the CO elimination from different streams at temperatures ranging from 250 to 400° C. The simulated mixture contains: 5000 ppm CO, 15000 ppm $O_2$, 25 ppm $SO_2$, ~17 ppm $NO_2$ and balance $N_2$, humidified with 6% water vapor.

FIG. 3 compares the percent CO removal from two different gas streams each containing 5000 ppm CO, by a catalyst that contains only a small amount of a noble metal (1% Pt), in the temperature range of 250 to 400° C. As can be readily seen, CO removal from the simulated mixture was about 20% higher at all the temperatures. Moreover, the catalyst was able to remove ~97% of hydrocarbon (in the form of toluene) as well. The performance of a catalyst formulation without the noble metal addition under identical conditions is shown in FIG. 4.

Figure 4:
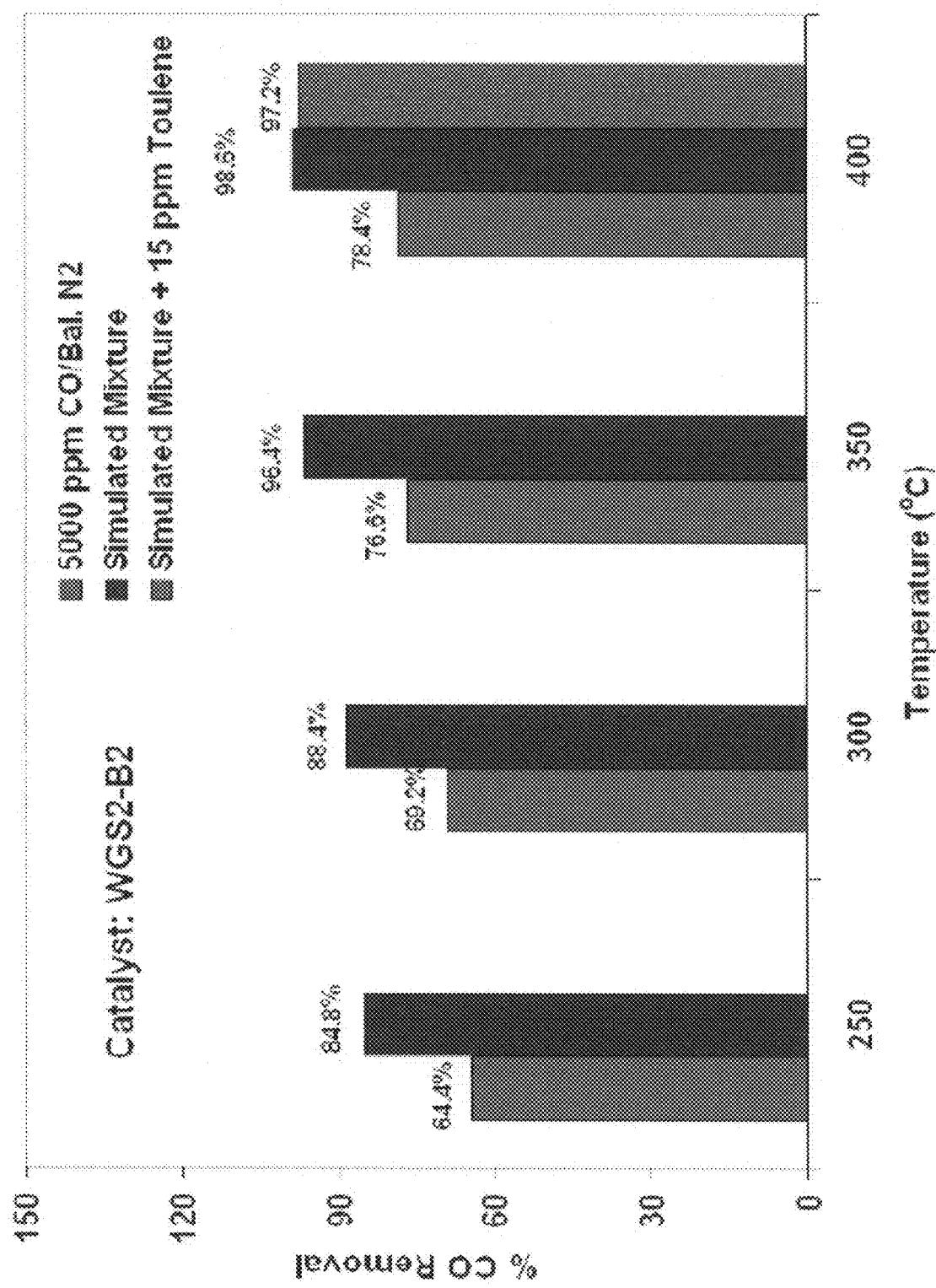
FIG. 4 is a graph showing the behavior of a WGS catalyst, WGS2B2, (which contains base metal oxides and no noble metals) in the CO elimination from different streams at temperatures ranging from 250 to 400° C. The simulated mixture contains: 5000 ppm CO, 15000 ppm $O_2$, 25 ppm $SO_2$, 17 ppm $NO_2$ and balance $N_2$, humidified with 6% water vapor.

FIG. 4 compares the percent CO removal from two different gas streams each containing 5000 ppm CO, by a catalyst that contains no noble metals, in the temperature range of 250 to 400° C. As can be readily seen, CO removal from the simulated mixture was about 20% higher at all the temperatures. Moreover, the catalyst was able to remove ~97% of hydrocarbon (in the form of toluene) as well. In this embodiment, the performance of the non-noble metal catalyst compares favorably to the Pt-catalyzed analog; in addition, the behaviors are identical at higher temperatures ($\geq 350°$ C.).

Figure 5:
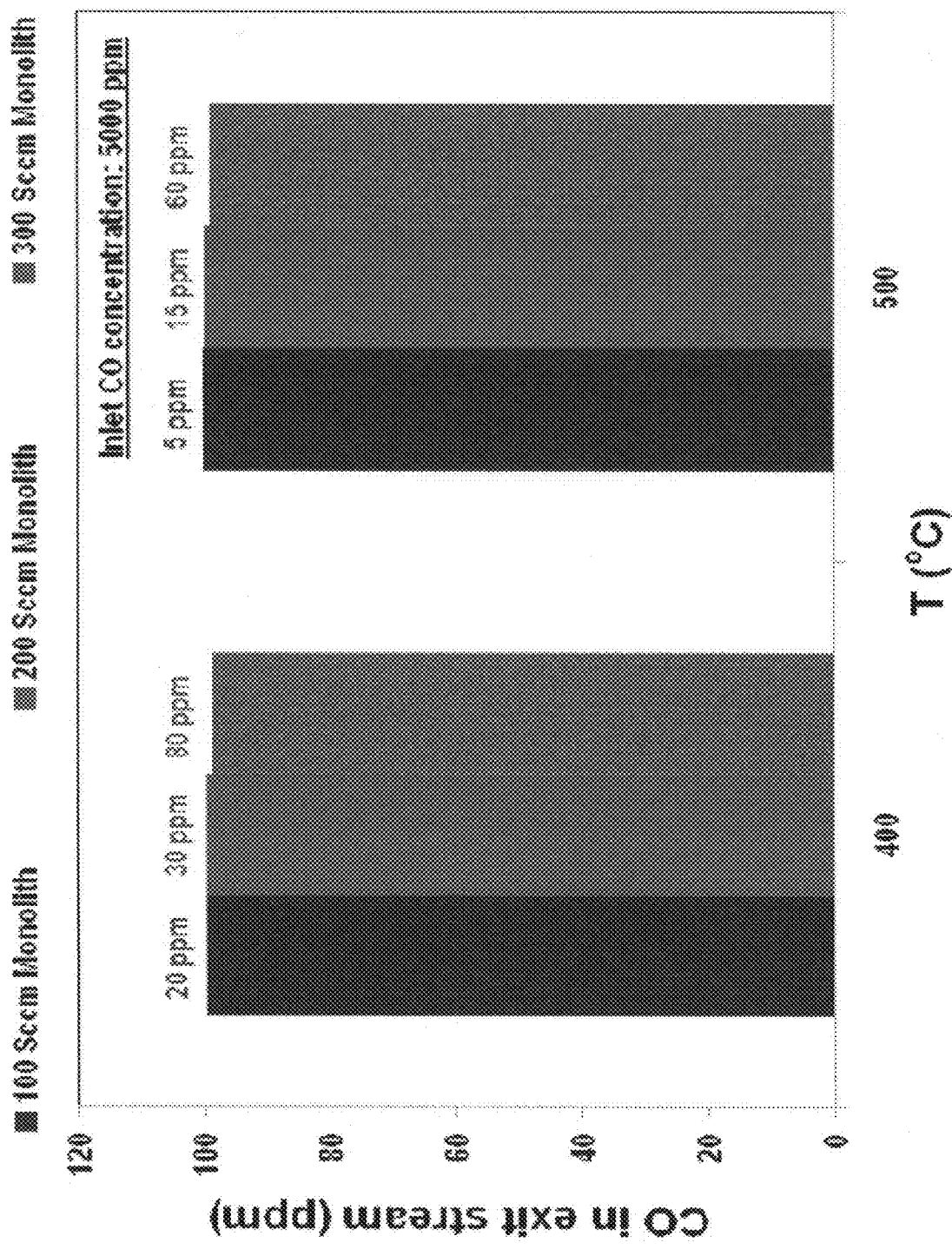
FIG. 5 is a graph showing the CO elimination capacity of the non-noble metal WGS catalyst formulation (WGS2B2 of FIG. 4) from a stream containing 5000 ppm CO-balance $N_2$ at 400° C. and at 500° C. in a washcoat format, at different volumetric flow rates. Inlet gas stream humidification level is 6%.

FIG. 5 shows the performance of non-noble metal catalysts in the simulated gas mixture containing 5000 ppm at 400 and 500° C. FIG. 5 shows that the effect of volumetric flow rate, as well as the enhancement in conversion when the catalyst is used as a washcoat on a monolith configuration, provides very high rates of CO removal from a simulated gas mixture contained $SO_2$, $NO_2$ and toluene. The exhaust from the catalytic reactor did not show any evidence of these species, thus confirming that they were eliminated too. The conversion of CO in the exhaust was more than 99+%, being better at higher temperature.

Figure 6:
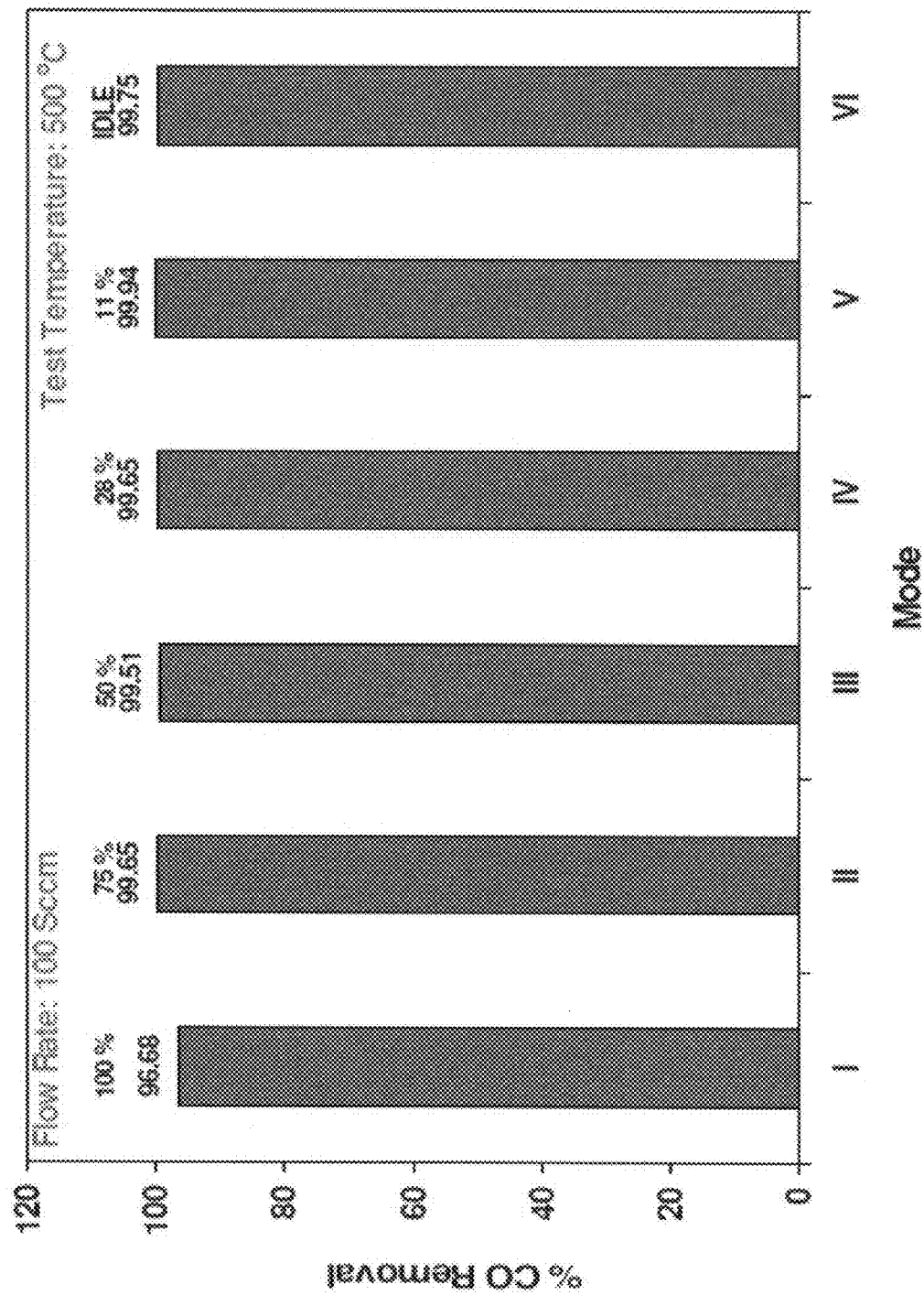
FIG. 6 is a graph showing the levels of CO elimination in a field test using Unleaded Test Gas UTG 96 (nominally $C_8H_{15}$) as fuel in a generator set (power rating 4.5 kW at 100%). The tests were conducted at 500° C., flow rate of 100 Sccm, in 6 modes (I-VI) under various power levels for 60 minutes at each mode: Mode I (100% power); Mode II (75% power); Mode III (50% power); Mode IV (28% power); Mode V (11% power); and Mode VI (0% power-idle).

FIG. 6 is a graph that illustrates the CO removal capability of a non-noble metal catalyst in a field test from the exhaust of a generator set using UTG 96 fuel. The tests results show that, in all the modes (each lasting 60 minutes), the CO removal was almost complete. The amount of CO (ppm) "in" and CO (ppm) "out"—where the test duration was 60 minutes per mode, the temperature was 500 C, the flow rate of 100 Sccm for a monolith coated with the catalyst composition WGS2B2—is shown in Table 3 below:

TABLE 3

| Mode | [CO] in (ppm) | [CO] out (ppm) | CO Removal |
|---|---|---|---|
| I (100%; 4.50 kW) | 1433 | 47.59 | 96.7% |
| II (75%; 3.25 kW) | 944 | 3.31 | 99.7% |
| III (50%; 2.25 kW) | 903 | 4.43 | 99.5% |
| IV (28%; 1.25 kW) | 1032 | 3.64 | 99.7% |
| V (11%; 0.5 kW) | 1100 | 0.64 | 99.9% |
| VI (0%; High Idle) | 860 | 2.18 | 99.8% |

Figure 7:
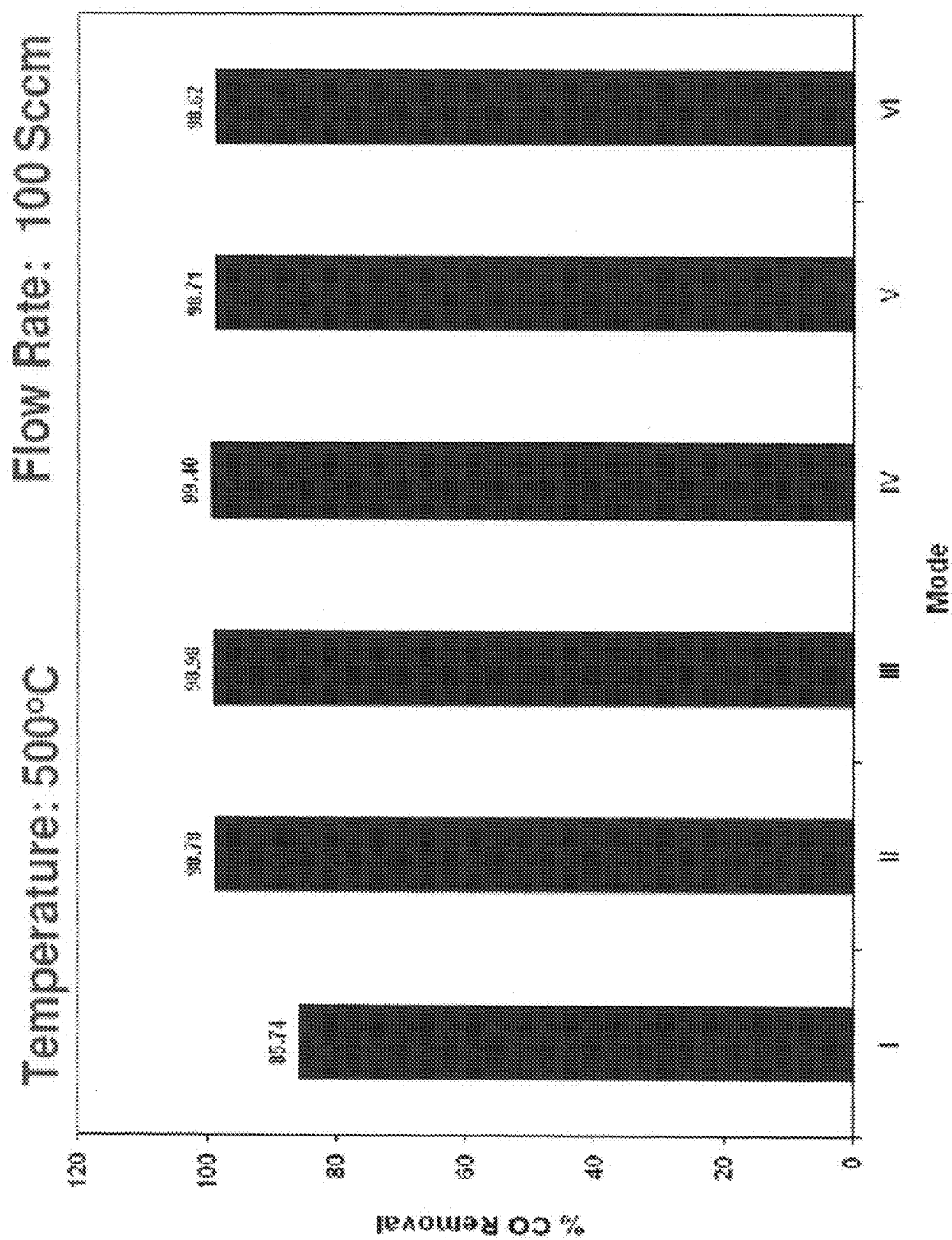
FIG. 7 is a graph showing the levels of CO elimination in a field test using Unleaded Test Gas UTG 96 (nominally $C_8H_{15}$) as fuel in a generator set (power rating 4.5 kW at 100%). The tests were conducted at 500° C., flow rate of 100 Sccm, in 6 modes (I-VI) under various power levels for 6 minutes at each mode: Mode I (100% power); Mode II (75% power); Mode III (50% power); Mode IV (28% power); Mode V (11% power); and Mode VI (0% power-idle).

The FIG. 7 is a graph that illustrates the CO removal capability of a non-noble metal catalyst in a field test from the exhaust of a generator set using UTG 96 fuel, at 500° C. and 100 Sccm. The tests results show that, in all the running modes II-VI (each lasting 6 minutes), the CO removal was almost complete (see Table 4 below).

The amount of CO (ppm) "in" and CO (ppm) "out"—where the test duration was 60 minutes per mode, the temperature was 500 C, the flow rate of 100 Sccm for a monolith coated with the catalyst composition WGS2B2—is shown in Table 4 below. In addition, the performance of the catalyst compositions do not degrade at 500° C. when the flow rate is 100 Sccm and about 70 to 80% hydrocarbons (HCs) are also eliminated between various modes, each lasting 6 minutes, as shown in Table 4 below.

TABLE 4

| Mode | [CO] in (ppm) | [CO] out (ppm) | % CO Removal | [HCs] in (ppm) | [HCs] out (ppm) | HCs Removal |
|---|---|---|---|---|---|---|
| VI (Idle) | 1136 | 2.75 | 99.7% | 53.27 | 5.82 | 83.1% |
| III (50%) | 818 | 3.48 | 96.6% | 33.40 | 8.73 | 82.7% |

The performance of the catalyst compositions do not degrade at 500° C. when the flow rate is doubled (200 Sccm) and about 70 to 80% hydrocarbons are also eliminated between various modes, each lasting 6 minutes, as shown in Table 5 below.

TABLE 5

| Mode | [CO] in (ppm) | [CO] out (ppm) | % CO Removal | [HCs] in (ppm) | [HCs] out (ppm) | HCs Removal |
|---|---|---|---|---|---|---|
| VI (Idle) | 2041.00 | 7.91 | 99.6% | 93.80 | 21.52 | 76.5% |
| III (50%) | 1644.31 | 5.41 | 99.6% | 95.30 | 19.07 | 79.5% |
| I (100%) | 2564.58 | 218.95 | 91.5% | 114.93 | 35.20 | 69.5% |
| VI (Idle) | 2050.00 | 5.98 | 99.7% | 101.63 | 24.89 | 77.0% |

Figure 8:
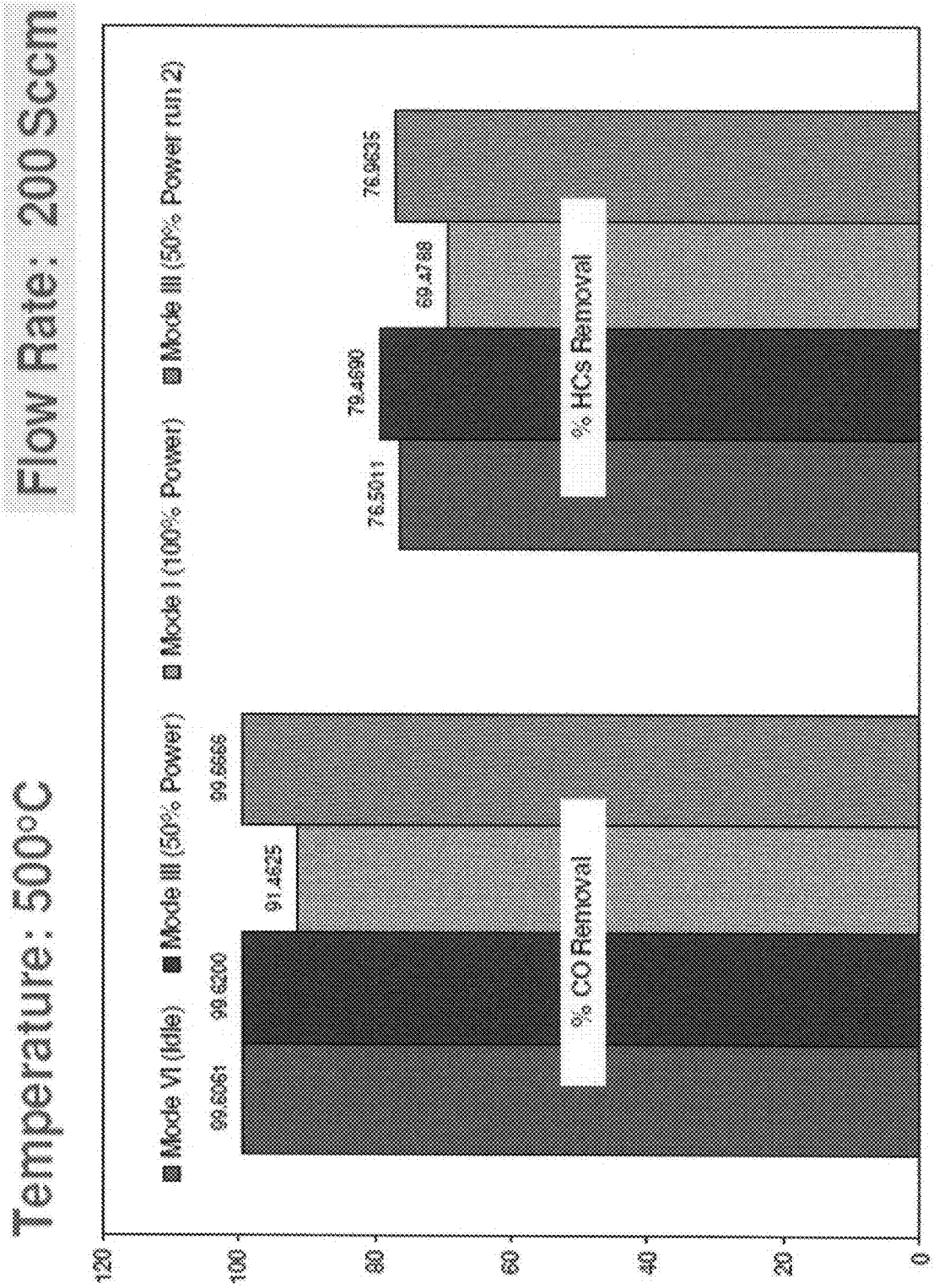
FIG. 8 is a graph showing the levels of carbon monoxide (CO) and hydrocarbon (HC) elimination in a field test using UTG 96 as fuel. The tests were conducted at 500° C., flow rate of 200 Sccm, for different modes under various power levels for 6 minutes at each mode: Mode VI (% power-idle); Mode III (50% power); Mode I (100% power; and Mode III (50% power, second run).

FIG. 8 is a graph showing the levels of carbon monoxide (CO) and hydrocarbon (HC) elimination in a field test using UTG 96 as fuel. The tests were conducted at 500° C., flow rate of 200 Sccm, for different modes under various power levels for 6 minutes at each mode: Mode VI (% power-idle); Mode III (50% power); Mode I (100% power; and Mode III (50% power, second run).

Figure 9:
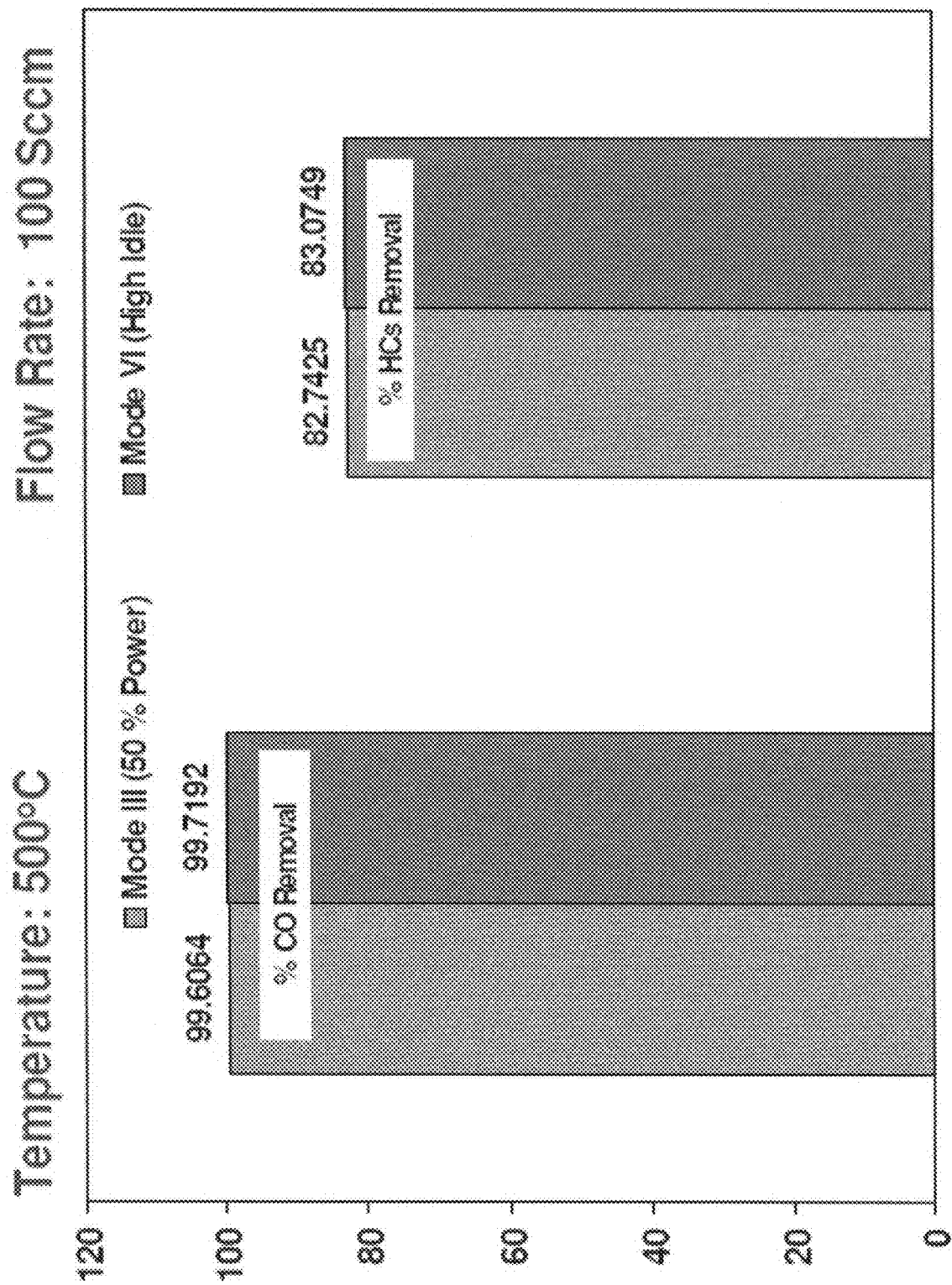
FIG. 9 is a graph showing the levels of carbon monoxide (CO) and hydrocarbon (HC) elimination in a field test using UTG 96 as fuel. The tests were conducted at 500° C., flow rate of 100 Sccm, for different modes under various power levels for 6 minutes at each mode: Mode III (50% power) and Mode VI (% power-idle).

FIG. 9 is a graph showing the levels of carbon monoxide (CO) and hydrocarbon (HC) elimination in a field test using UTG 96 as fuel. The tests were conducted at 500° C., flow rate of 100 Sccm, for different modes under various power levels for 6 minutes at each mode: Mode III (50% power) and Mode VI (% power-idle).

Table 6 shows the catalyst WGS2B composition used in different loading types, powder and monoliths at different temperatures with a simulated gas mixture.

TABLE 6

| Catalyst - WGS2B2 | | | | | |
|---|---|---|---|---|---|
| | | Experiment with Simulated Gas Mix | | | |
| Loading Type | 100 Sccm Temperature (° C.) | CO in (ppm) | CO out (ppm) | CO Removed (ppm) | CO Removal (%) |
| Powder | 400 | 5000 | 70 | 4930 | 98.60 |
| Monolith | 400 | 5000 | 20 | 4980 | 99.60 |
| Monolith | 500 | 5000 | 5 | 4995 | 99.90 |
| | | Experiment with Simulated Gas Mix | | | |
| Loading Type | 200 Sccm Temperature (° C.) | CO in (ppm) | CO out (ppm) | CO Removed (ppm) | CO Removal (%) |
| Monolith | 400 | 5000 | 30 | 4970 | 99.40 |
| Monolith | 500 | 5000 | 15 | 4985 | 99.70 |
| | | Experiment with Simulated Gas Mix | | | |
| Loading Type | 300 Sccm Temperature (° C.) | CO in (ppm) | CO out (ppm) | CO Removed (ppm) | CO Removal (%) |
| Monolith | 400 | 5000 | 80 | 4920 | 98.40 |
| Monolith | 500 | 5000 | 60 | 4940 | 98.80 |

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed herein contemplated for carrying out this invention, but that the invention will include all embodiments falling within the scope of the claims.

What is claimed is:

1. A catalyst composition comprising:
  i) at least one non-noble metal catalytic component selected from one or more metal oxides (MOs) selected from those of titanium, iron, copper, zinc and tin, and
  ii) at least one substrate material, the substrate material being comprised of gadolinia doped ceria wherein the gadolinia is present at about 2 to about 20%, by mole fraction, of the substrate material,
  wherein the catalyst composition comprises a uniform mixture of the catalytic component and the substrate material.

2. The catalyst composition of claim 1, wherein the catalytic component is dispersed onto the substrate material, such that the catalyst composition is a homogenous nanoscale matrix material.

3. The catalyst composition of claim 1, wherein the dopant is present in an amount between about 1% and about 10%, by mole fraction, of the substrate material.

4. The catalyst composition of claim 1, wherein the substrate material has a surface area of at least about 120 m²/g.

5. The catalyst composition of claim 1, wherein the substrate material has a surface area of at least about 150 m²/g.

6. The catalyst composition of claim 1, wherein substrate material comprises particles having sizes ranging between about 5 nm and about 20 nm.

7. The catalyst composition of claim 1, wherein the substrate material is porous.

8. The catalyst composition of claim 1, wherein the substrate material a porous, and the catalytic component is dispersed over the entire surface of the substrate material.

9. The catalyst composition of claim 1, further including one or more additional catalytic components comprised of: gold, platinum, palladium or rhodium particles having sizes ranging between about 5 nm and about 10 nm.

10. The catalyst composition of claim 1, comprising a homogenous mixture of the non-noble metal catalytic component and the substrate material provided as a free-flowing dry powder.

11. The catalyst composition of claim 1, wherein the catalytic component is present in a total amount between about 0.5% and about 20%, by weight, of the catalyst composition.

12. The catalyst composition of claim 1, wherein the catalytic component is present in a total amount between about 1 and about 10%, by weight, of the catalyst composition.

13. The catalyst composition of claim 1, wherein the catalytic component comprises one or more metal oxides selected from the group of: $TiO_2$ (titanium dioxide), $Fe_2O_3$ (iron oxide), CuO (copper oxide), ZnO (zinc oxide), tin oxide ($SnO_2$), and combinations thereof.

14. The catalyst composition of claim 1, wherein the catalyst composition was formed by:
    forming slurry of at least one nanocrystalline sized substrate material and at least one water soluble salt of the catalytic component, and
    mixing and heating the slurry to substantially remove solvent fractions from the slurry.

15. The catalyst composition of claim 1, wherein the catalyst composition was formed by adding at least one active substrate and at least one catalytic component to a liquid medium, and mixing so that the catalytic components are incorporated homogeneously throughout the active substrate.

16. The catalyst composition of claim 1, wherein the substrate material comprises gadolinia-doped ceria (GDC), formed by:
    bringing salts of gadolinium and cerium into solution;
    precipitating out GDC from the solution; and
    subjecting the precipitate to a high pressure-low temperature process to cause nano-crystallization of the substrate material.

17. A catalyst system comprising the catalyst composition of claim 1, wherein the catalyst composition is in a packed bed or fluidized bed without any accompanying support.

18. A catalyst system comprising the catalyst composition of claim 1 provided on a support structure.

19. The catalyst system of claim 18, wherein the support structure comprises a ceramic monolith or honeycomb structure.

20. The catalyst system of claim 19, wherein the support ceramic monolith or honeycomb comprises one or more of: alumina, silica, aluminosilicates, and stainless steel.

21. A catalytic system for the elimination of harmful pollutants such as CO, HCs, VOCs, $NO_x$ and $SO_2$ from automotive exhaust, power generating systems and paint booths, comprising the catalyst composition of claim 1.

22. An exhaust gas treatment catalyst system, wherein the system comprises a support that is washcoated with the catalyst composition of claim 1.

23. An automobile exhaust gas treatment catalyst system, comprising the catalyst composition of claim 1.

24. The system of claim 23, wherein the system comprises a monolith disposed within an exhaust stream of a combustion engine.

25. The system of claim 23, wherein a concentration level of at least CO in an exhaust stream is reduced by at least about 40% at 250° C.

26. The system of claim 23, wherein a concentration level of at least CO in an exhaust stream is reduced by at least about 85% at 500° C.

27. The system of claim 23, wherein a concentration level of at least CO in an exhaust stream is reduced by at least about 95% at 500° C.

28. The system of claim 23, wherein a concentration level of at least HCs in an exhaust stream is reduced by at least about 60% at 250° C.

29. The system of claim 23, wherein a concentration level of at least HCs in an exhaust stream is reduced by at least about 70% at 500° C.

30. A method of treating an automobile exhaust gas comprising:
    contacting an exhaust gas stream with a catalyst composition of claim 1.

31. A spray booth exhaust gas treatment catalyst system, comprising the catalyst composition of claim 1.

32. The system of claim 31, wherein the system comprises a monolith disposed within an exhaust stream of a paint spray booth.

33. A method of treating a spray booth exhaust gas comprising:
    contacting an exhaust gas stream with a catalyst composition of claim 1.

34. A method for treating a gas comprising one or more of hydrocarbons, carbon monoxide and nitrogen oxides, the method comprising:
    contacting the catalyst composition of claim 1, with the gas,
    catalytically oxidizing the hydrocarbons and carbon monoxide, and
    catalytically reducing the nitrogen oxides in the gas in the presence of the catalyst composition.

* * * * *